United States Patent [19]
Miyako et al.

[11] Patent Number: 5,780,984
[45] Date of Patent: Jul. 14, 1998

[54] APPARATUS AND METHOD FOR CONTROLLING ROTATION FREQUENCY OF INFINITE VARIABLE-SPEED DRIVE

[75] Inventors: Michio Miyako, Osaka; Minoru Takaoka; Hiroyuki Tanaka, both of Kyoto, all of Japan

[73] Assignee: Tsubakimoto Chain Co., Osaka, Japan

[21] Appl. No.: 820,032

[22] Filed: Mar. 19, 1997

Related U.S. Application Data

[63] Continuation of Ser. No. 640,030, Apr. 29, 1996, abandoned.

[30] Foreign Application Priority Data

May 17, 1995 [JP] Japan ................................. 7-118621

[51] Int. Cl.⁶ ................................................. H02P 5/34
[52] U.S. Cl. ........................... 318/268; 318/503; 388/814
[58] Field of Search ........................ 318/268, 53, 59, 318/66, 807, 503; 388/800, 814, 820, 832; 198/952

[56] References Cited

U.S. PATENT DOCUMENTS

| | | |
|---|---|---|
| 3,578,955 | 5/1971 | Kloven . |
| 3,641,263 | 2/1972 | Rhoads et al. . |
| 4,099,297 | 7/1978 | Hasegawa et al. ............... 318/599 X |
| 4,152,631 | 5/1979 | Weinberg et al. ............... 318/601 X |
| 4,315,200 | 2/1982 | Yamada et al. ................... 318/603 |
| 4,706,556 | 11/1987 | Wallace et al. . |
| 5,347,791 | 9/1994 | Ginzl et al. . |
| 5,684,275 | 11/1997 | Tolson . |

FOREIGN PATENT DOCUMENTS

| | | |
|---|---|---|
| 55-002569 | 1/1980 | Japan . |
| 63-060229 | 3/1988 | Japan . |

*Primary Examiner*—Bentsu Ro
*Attorney, Agent, or Firm*—Darby & Darby

[57] ABSTRACT

The invention provides an apparatus and a method for controlling the rotation frequency of an infinite variable-speed drive in which, when an error is caused in an output rotation frequency of the infinite variable-speed drive during a processing time period, a target rotation frequency is calculated in view of the error, so as to control the rotation frequency in the remaining processing time period in accordance with the calculated target rotation frequency. The target rotation frequency is calculated on the basis of the remaining processing time period and a pulse number to be counted in the remaining processing time period.

4 Claims, 4 Drawing Sheets

APPARATUS AND METHOD FOR CONTROLLING ROTATION FREQUENCY OF INFINITE VARIABLE-SPEED DRIVE

This is a continuation of application Ser. No. 08/640,030, filed Apr. 29, 1996, now abandoned.

BACKGROUND OF THE INVENTION

1. Field of the Invention

The present invention relates to an apparatus and a method for controlling the rotation frequency of an infinite variable-speed drive.

2. Description of Related Art

In one of the production lines in the food industry, food to be produced are set on a conveyor so as to be heated by transferring them through an oven in a predetermined period of time. In such a production line, the time period required for transferring the food through the oven is first determined to be constant, and the rotation frequency of an infinite variable-speed drive for driving the conveyor is obtained on the basis of the determined time period and the travel distance of the conveyor within the oven. Under the control using the obtained rotation frequency, the travel speed of the conveyor is stabilized.

However, a conventional apparatus for controlling the rotation frequency of the infinite variable-speed drive for driving the conveyor controls the rotation frequency alone by calculating the rotation frequency of the infinite variable-speed drive according to the predetermined time period required for transferring the food through the oven. Therefore, in the case where the rotation frequency of the infinite variable-speed drive is varied while the food is being transferred through the oven, the variation in the rotation frequency results in accumulating errors in the rotation frequency during the transferring time. As a result, the time period for transferring the food through the oven can be disadvantageously varied.

SUMMARY OF THE INVENTION

The present invention was devised to overcome the aforementioned problems, and the object of the invention is providing a rotation frequency control apparatus for controlling an infinite variable-speed drive with minimized errors in a processing time period in accordance with the increase/decrease of the rotation frequency of the infinite variable-speed drive.

The rotation frequency control apparatus for an infinite variable-speed drive of this invention comprises a pulse counter for counting the number of pulses outputted by a rotation sensor; a time set unit for setting a first time period; means for receiving a total pulse number of the pulses counted by the pulse counter during the first time period; timing means for timing a predetermined time period within the first time period; means for calculating a calculated pulse number to be counted during the predetermined time period on the basis of the total pulse number; comparing means for comparing the calculated pulse number with an accumulated pulse number counted by the pulse counter from a start of the first time period during the predetermined time period; means for calculating a target rotation frequency on the basis of remaining time obtained by subtracting the predetermined time period from the first time period and a remaining pulse number obtained by subtracting the accumulated pulse number from the total pulse number when there is a difference between the accumulated pulse number and the calculated pulse number; and means for driving the pilot motor on the basis of the calculated target rotation frequency.

In one aspect of the rotation frequency control apparatus, the timing means times a second time period obtained by equally dividing the first time period, the means for calculating the calculated pulse number multiplies a reference pulse number per second time period by an accumulated number of the second time period(s), the comparing means compares, every time the timing means completes to time one second time period, the accumulated pulse number counted by the pulse counter by the end of timing the second time period with the calculated pulse number, and the means for calculating the target rotation frequency uses remaining time obtained by subtracting accumulated time of the second time period(s) from the first time period and a remaining pulse number obtained by subtracting the accumulated pulse number from the total pulse number when there is a difference between the accumulated pulse number and the calculated pulse number.

The method for controlling a rotation frequency of an infinite variable-speed drive of this invention comprises the steps of setting a first time period; counting a total pulse number during the first time period by using a pulse counter for counting the number of pulses outputted by a rotation sensor; timing a predetermined time period from a start of the first time period by using timing means; calculating a calculated pulse number to be counted during the predetermined time period on the basis of the total pulse number; comparing the calculated pulse number with an accumulated pulse number counted by the pulse counter from the start of the first time period during the predetermined time period; calculating a target rotation frequency on the basis of remaining time obtained by subtracting the predetermined time period from the first time period and a remaining pulse number obtained by subtracting the accumulated pulse number from the total pulse number when there is a difference between the accumulated pulse number and the calculated pulse number; and driving the pilot motor on the basis of the calculated target rotation frequency.

In one aspect of the method for controlling the rotation frequency of an infinite variable-speed drive, in the step of timing the predetermined time, a second time period obtained by equally dividing the first time period is timed by using the timing means; in the step of calculating the calculated pulse number, a reference pulse number per second time period is multiplied by an accumulated number of the second period(s), and in the step of comparing, every time the timing means completes to time one second time period, an accumulated pulse number counted by the pulse counter by the end of timing the second time period is compared with a calculated pulse number obtained by multiplying the reference pulse number by an accumulated number of the second time period(s); and in the step of calculating the target rotation frequency, remaining time obtained by subtracting accumulated time of the second time period(s) from the first time period and a remaining pulse number obtained by subtracting the accumulated pulse number from the total pulse number are used when there is a difference between the accumulated pulse number and the calculated pulse number.

Accordingly, an error in the output rotation frequency caused by the decrease/increase of the output rotation frequency of the infinite variable-speed drive can be detected as discord between the accumulated pulse number and the calculated pulse number. When the error is detected, a target rotation frequency is calculated in view of the error, and the rotation frequency of the infinite variable-speed drive in the remaining first time period or the subsequent second time period is controlled on the basis of the target rotation frequency. The target rotation frequency is calculated by dividing the remaining pulse number obtained by subtracting the accumulated pulse number from the total pulse number by the remaining first time period at the end of timing the predetermined time period or each second time period. The rotation frequency of the infinite variable-speed drive is controlled in the same manner also during the remaining time period or the second time period(s) after the comparison. Thus, errors in the output rotation frequency of the infinite variable-speed drive are prevented from being accumulated. As a result, errors within the first time period can be minimized.

The above and further objects and features of the invention will more fully be apparent from the following detailed description with accompanying drawings.

DETAILED DESCRIPTION OF THE INVENTION

The present invention will now be described in detail referring to the accompanying drawings illustrating the embodiment thereof.

Figure 1:
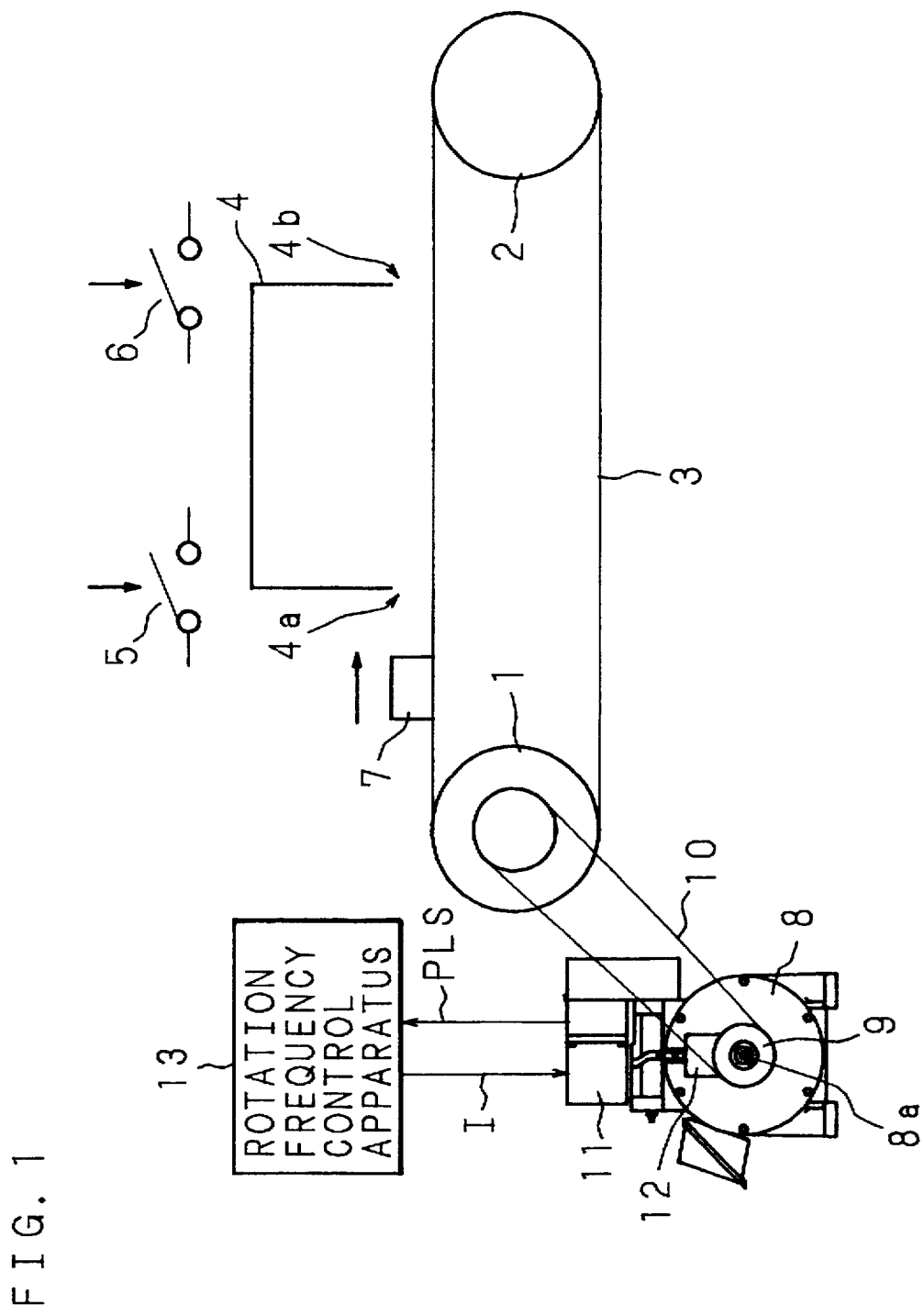
FIG. 1 is a schematic diagram of a conveyor utilizing a rotation frequency control apparatus for an infinite variable-speed drive according to the invention.

FIG. 1 is a schematic diagram of a conveyor utilizing a rotation frequency control apparatus for an infinite variable-speed drive according to the invention. A conveyor belt 3 is stretched between conveyor wheels 1 and 2. A part of the conveyor belt 3 positioned on the upper side thereof is allowed to pass through an oven 4. An inlet 4a of the oven 4 is provided with a teaching switch 5 for generating a timing signal, and also an outlet 4b of the oven 4 is provided with another teaching switch 6 for generating another timing signal.

On the conveyor belt 3 is placed a material 7 to be heated. A belt 10 is stretched between the driving shaft of the conveyor wheel 1 and a belt pulley 9 provided on an output shaft 8a of an infinite variable-speed drive 8. The infinite variable-speed drive 8 comprises an input shaft (not shown) directly connected with an output shaft of a motor and the output shaft 8a to which the torque of the input shaft is transferred through a speed change mechanism. The infinite variable-speed drive 8 further comprises a pilot motor 11 for driving the speed change mechanism, and a rotation sensor 12 interlocked with the output shaft 8a for detecting the rotation frequency of the output shaft 8a, so as to output twenty pulses per rotation of the output shaft 8a.

When the pilot motor 11 is driven, a plurality of planetary gears disposed on a circumference concentric with the output shaft 8a are moved in the radial direction of the output shaft 8a in the speed change mechanism, so as to change the rotation frequency of the output shaft 8a. When the pilot motor 11 is driven in the positive direction, the rotation frequency of the output shaft 8a is increased, and when the pilot motor 11 is driven in the negative direction, the rotation frequency of the output shaft 8a is decreased. A pulse PLS outputted by the rotation sensor 12 is supplied to a rotation frequency control apparatus 13, which supplies a driving current I to the pilot motor 11. The infinite variable-speed drive used in this embodiment is a DISCO infinite variable-speed drive, which is a product of the Applicant and adopts a planetary-gear friction system for steplessly changing the rotation frequency of the output shaft through a speed change operation or a speed control operation during driving.

Figure 2:
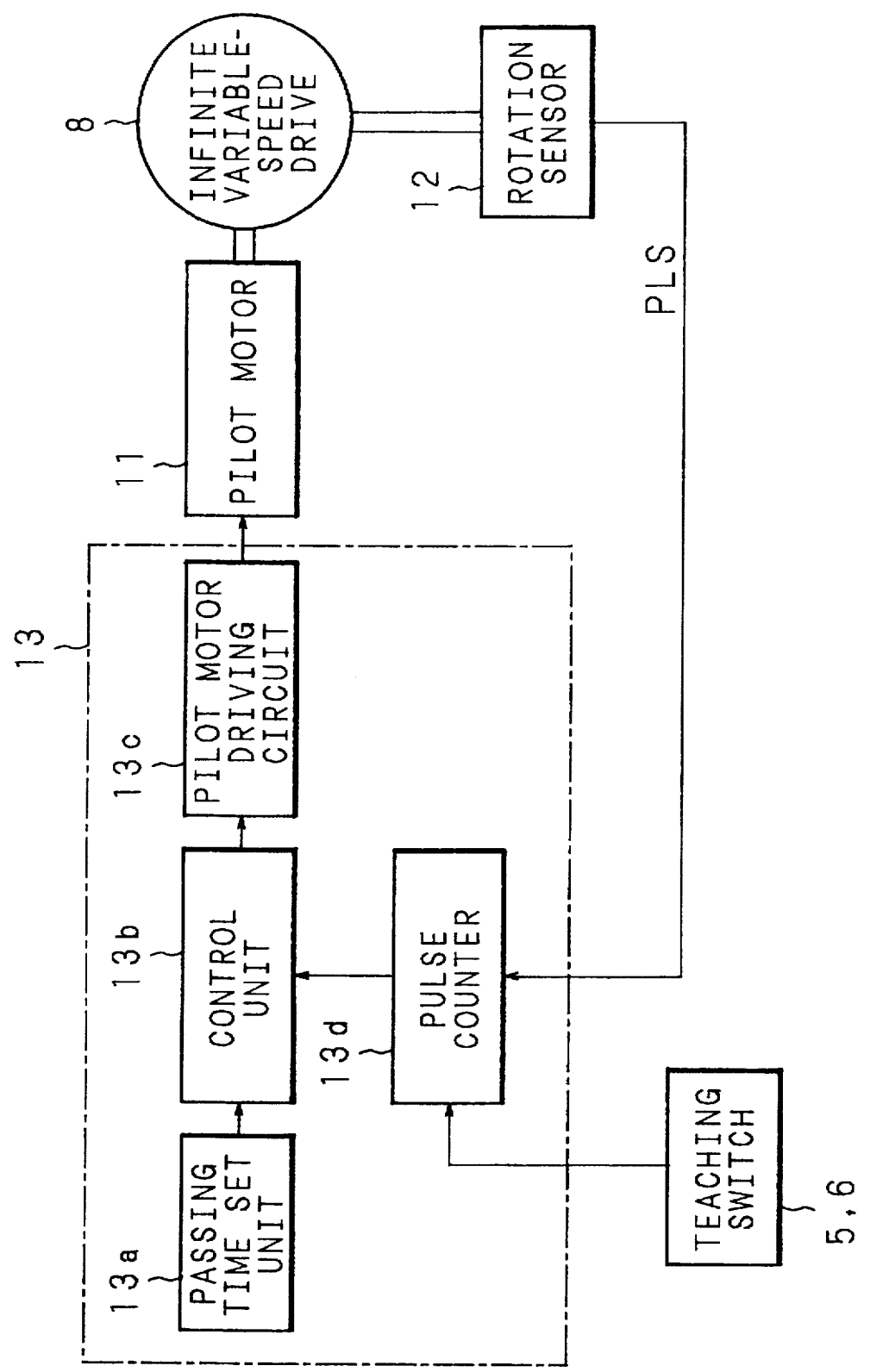
FIG. 2 is a block diagram for showing the configuration of the rotation frequency control apparatus together with the infinite variable-speed drive.

FIG. 2 is a block diagram for showing the configuration of the rotation frequency control apparatus 13 together with the infinite variable-speed drive 8. Passing time data obtained by a passing time set unit 13a, where predetermined passing time of the conveyor belt 3 through the oven 4 (shown in FIG. 1) is previously set, are inputted to a control unit 13b. The control unit 13b includes a timer not shown. A driving signal for the pilot motor 11 outputted by the control unit 13b is inputted to a pilot motor driving circuit 13c. A driving current outputted by the pilot motor driving circuit 13c in accordance with the received driving signal is supplied to the pilot motor 11. Thus, the pilot motor 11 drives the speed change mechanism (not shown) of the infinite variable-speed drive 8.

The output pulses PLS outputted by the rotation sensor 12 in a cycle according to the rotation frequency of the output shaft 8a of the infinite variable-speed drive 8 are inputted to a pulse counter 13d. The timing signals generated by operating the teaching switches 5 and 6 are inputted to the pulse counter 13d as signals corresponding to the start and the end of its pulse counting operation, respectively.

Figure 3:
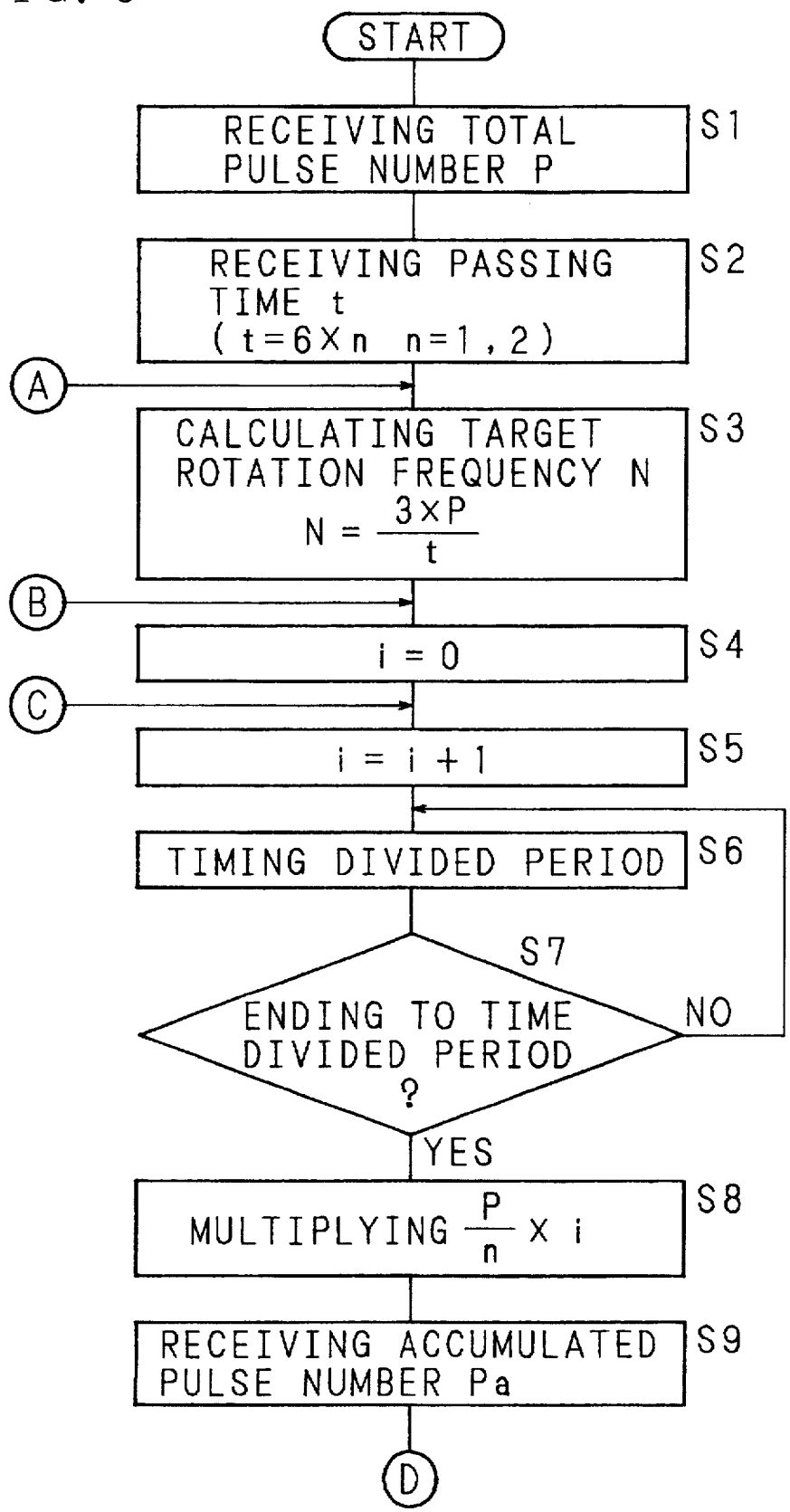
FIG. 3 is a flow chart showing the first half of the controlling procedures by a control unit.
Figure 4:
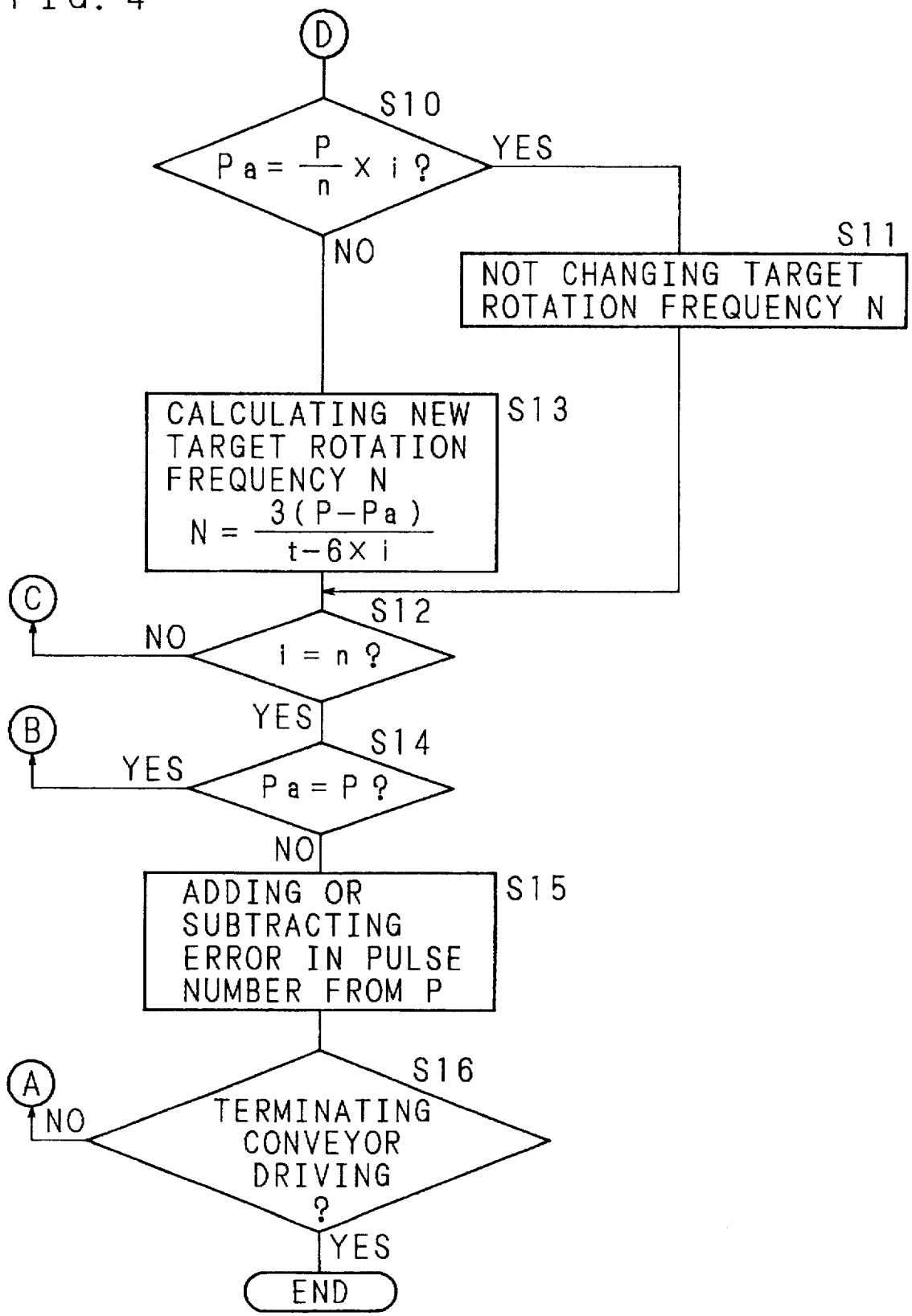
FIG. 4 is a flow chart showing the second half of the controlling procedures by the control unit.

Now, the rotation frequency control operation by the rotation frequency control apparatus 13 for the infinite variable-speed drive having the aforementioned configuration will be described referring to flow charts of FIGS. 3 and 4 showing the control procedures by the control unit 13b. First, passing time t required for the conveyor belt 3 to pass through the oven 4 (hereinafter referred to as the passing time) is previously determined and set in the passing time set unit 13a. When a period obtained by equally dividing the passing time t (hereinafter referred to as a divided period) is set to be 6 seconds, the passing time t is set to have a value six times as large as the division number n for equally dividing the passing time t.

Then, the motor (not shown) whose output shaft is directly connected with the input shaft of the infinite variable-speed drive 8 is driven so as to drive the infinite variable-speed drive 8. Thus, the torque of the infinite variable-speed drive 8 is transferred through the belt 10 to the conveyor wheel 1, so as to move the conveyor belt 3 in the direction shown with an arrow in FIG. 1. Also, the operation of the infinite variable-speed drive 8 drives the rotation sensor 12, so that the rotation sensor 12 outputs the pulses in a cycle according to the rotation frequency of the output shaft 8a of the infinite variable-speed drive 8 to the pulse counter 13d. When the material 7 to be heated on the conveyor belt 3 reaches the inlet 4a of the oven 4, the teaching switch 5 is turned off, so that the timing signal generated by the teaching switch 5 is supplied to the pulse counter 13d. At the time of receiving this timing signal, the pulse counter 13d starts to count the number of the received pulses.

When the material 7 to be heated reaches the outlet 4b of the oven 4, the teaching switch 6 is turned off, so that the timing signal generated by the teaching switch 6 is supplied to the pulse counter 13d. At the time of receiving this timing signal, the pulse counter 13d completes its counting operation. Thus, the count value of the pulse counter 13d corresponds to a total pulse number P of the pulses which are outputted by the rotation sensor 12 during the passage of the material 7 on the conveyor belt 3 through the oven 4. The total pulse number P corresponds to a travel distance of the conveyor belt 3 within the oven 4, and thus the distance is determined. Thereafter, the pulse counter 13d continues to count the number of the pulses outputted by the rotation sensor 12.

Now, referring to FIG. 3, the control unit 13b first is supplied with the total pulse number P obtained by the pulse counter 13d (step S1). Then, the control unit 13b is supplied with the data of the passing time t (=6×n) set in the passing time set unit 13a (step S2), and calculates a target rotation frequency N based on an equation, $N=(3\times P)/t$, in the following manner (step S3): The rotation sensor 12 outputs twenty pulses per rotation of the output shaft 8a of the infinite variable-speed drive 8 as described above, and hence, a target rotation speed at the time when the material 7 to be heated reaches the inlet 4a of the oven 4, that is, the target rotation frequency N in a first divided period obtained by equally dividing the passing time t, can be determined on the basis of the following equation (1):

Equation (1):

$$N=(P/20)\times(1/t)\times 60=(3\times P)/t$$

The driving signal in accordance with the calculated target rotation frequency N is inputted to the pilot motor driving circuit 13c, so that the pilot motor 11 is driven in accordance with the output signal of the pilot motor driving circuit 13c. Thus, the rotation frequency of the infinite variable-speed drive 8 becomes equal to the target rotation frequency N. As a result, the conveyor belt 3 is driven to move at a speed in accordance with the target rotation frequency N during the first divided period.

Then, the accumulated number i of the divided period(s) each obtained by equally dividing the passing time t is initialized to be 0 (step S4). When the material 7 to be heated reaches the inlet 4a of the oven 4, the accumulated number i of the divided period(s) is increased by one so that i=1 (step S5). Thus, the first divided period starts. Then the divided period is timed (step S6) by checking whether or not the divided period has been timed (step S7) until the divided period elapses. When it is determined that the divided period has been timed, the total pulse number P counted within the passing time t is divided by the division number n for equally dividing the passing time t, thereby calculating a reference pulse number. The obtained reference pulse number is multiplied by the accumulated number i of the divided period(s), thereby obtaining a calculated pulse number (step S8). Also, the control unit 13b is supplied with an accumulated pulse number $P_a$ obtained by counting, by the pulse counter 13d, the number of the pulses outputted by the rotation sensor 12 within the first divided period (step S9).

Then, it is determined whether or not the accumulated pulse number $P_a$ is equal to the calculated pulse number obtained by multiplying the reference pulse number by the accumulated number of the divided period(s), that is, (P/n)×i (step S10). When the numbers are equal to each other, it is confirmed that no error is caused in the target rotation frequency N within the first divided period, and hence, this target rotation frequency N is not changed (step S11) to be used as a target frequency number in the subsequent divided period. Then, it is determined whether or not the accumulated number i of the divided period(s) is n (step S12). When it is determined that the accumulated number i of the divided period(s) is not equal to the division number n of the passing time t, the procedure returns to step S5, where the accumulated number i of the divided period(s) is increased by one.

When an error is caused in the rotation frequency in the first divided period and the accumulated pulse number $P_a$ is not equal to the calculated pulse number obtained based on (P/n)×i (step S10), a new target rotation frequency N is calculated on the basis of an equation, $N=\{3(P-P_a)\}/(t-6\times i)$ (step S13). Specifically, the new target rotation frequency N is calculated in view of the error on the basis of a remaining pulse number obtained by subtracting the accumulated pulse number $P_a$ from the total pulse number P and remaining time obtained by subtracting the accumulated divided period(s) from the passing time t. This new target rotation frequency is used in the subsequent second divided period. The pilot motor 11 is driven in accordance with this new target rotation frequency, so as to control the rotation frequency of the infinite variable-speed drive 8. Then, as described above, it is determined whether or not the accumulated number i of the divided period(s) is n (step S12). When it is determined that the accumulated number i of the divided period(s) is not equal to the division number n of the passing time t, the procedure returns to step S5, where the accumulated number i of the divided period(s) is increased by one.

In this manner, when an error is caused in the rotation frequency, the conveyor belt 3 is driven at a speed according to a newly calculated target rotation frequency, so as to move in the subsequent divided period at this speed.

By repeating such procedures, even if an error in the rotation frequency is caused every 6 seconds, that is, every time one divided period obtained by equally dividing the passing time t is timed, a new target rotation frequency is calculated based on a remaining pulse number in view of the error and remaining time within the first time, so that the rotation frequency of the infinite variable-speed drive is controlled to move the conveyor belt 3. Therefore, even when an error is caused in the rotation frequency in the passing time t, the error is prevented from being accumulated. Thus, an error in the rotation frequency caused during the passing time can be suppressed to as small as possible.

When the accumulated number i of the divided period(s) is determined to be equal to the division number n of the passing time (step S12), it is determined whether or not the accumulated pulse number $P_a$ counted by the pulse counter 13d from step S5 is equal to the total pulse number P (step S14). When the numbers are determined to be equal to each other, it is confirmed that no error is caused between the actual rotation frequency and the target rotation frequency in one cycle of the passing time t, and the procedure returns to step S4. Then, the accumulated number i of the divided periods is initialized to be 0 again, and the rotation frequency in the subsequent cycle of the passing time t is determined every time one divided period is timed in the same manner as described above.

When it is determined that the accumulated pulse number $P_a$ is not equal to the total pulse number P in step S14, an error in the pulse number is added to or subtracted from the total pulse number P (step S15). Then, it is determined whether or not the conveyor driving has been terminated (step S16), and when the conveyor is still driven, the procedure returns to step S3. The new total pulse number P obtained in view of the error by adding or subtracting the error in the pulse number is used together with the passing time t for the calculation using the equation of $N=(3\times P)/t$, thereby obtaining a new target rotation frequency N in the subsequent cycle of the passing time t (step S3). In this manner, after one cycle of the passing time t and at the start of the subsequent cycle of the passing time t, the new target rotation frequency N obtained in view of the error having been caused can be calculated.

Thereafter, the target rotation frequency is similarly calculated so as to control the rotation frequency of the infinite variable-speed drive 8 in the same manner as described above. When the moving of the conveyor is determined to have been terminated in step S16, the control operation for the rotation frequency of the infinite variable-speed drive 8 is completed.

In this manner, when an error is caused in the rotation frequency of the infinite variable-speed drive, a new target rotation frequency is calculated in view of the error caused in the rotation frequency every time one divided period, which is obtained by equally dividing passing time required for transferring the conveyor belt 3 through the oven 4, is timed. Therefore, it is possible to prevent errors in the rotation frequency of the infinite variable-speed drive from being accumulated while the material 7 to be heated is being transferred through the oven 4. Thus, the passing time of the material 7 to be transferred through the oven 4 can be equal to the previously set passing time t. As a result, the time for heating food by the oven 4 can be made constant, thereby solving a problem of insufficient or excessive heating of food products.

In this embodiment, the infinite variable-speed drive is used to drive the conveyor adopted in a production line for food. However, the embodiment is merely an example of the application of the invention, to which the invention is not limited.

Also, the infinite variable-speed drive used in this embodiment is the product of the Applicant. However, the infinite variable-speed drive is not limited to this but, needless to say, can be any infinite variable-speed drive whose rotation frequency can be similarly controlled. Furthermore, the number of the pulses outputted by the rotation sensor per rotation of the output shaft and the divided period of 6 seconds obtained by equally dividing the passing time are merely examples, and the invention is not limited to the exemplified values.

As described above, according to the present invention, every time one divided period obtained by equally dividing predetermined passing time is timed, it is determined whether or not there is a difference between an accumulated pulse number and a calculated pulse number obtained by multiplying a reference pulse number by an accumulated number of the divided period(s). When there is a difference, namely, when an error is caused, a new target rotation frequency is calculated in view of the error in the rotation frequency on the basis of a remaining pulse number obtained by subtracting the accumulated pulse number counted by a pulse counter from a total pulse number in the passing time and remaining time obtained by subtracting accumulated divided period(s) from the passing time. A pilot motor is driven in accordance with the thus calculated target rotation frequency so as to control the rotation frequency of the infinite variable-speed drive. Therefore, the errors in the rotation number are prevented from being accumulated during the passing time. As a result, for example, a conveyor belt driven by the infinite variable-speed drive can always pass through an oven in a constant period of time. In this manner, the invention provides a rotation frequency control apparatus for an infinite variable-speed drive having an extremely small error in the rotation frequency during a predetermined passing time period.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A rotation frequency control apparatus for an infinite variable-speed drive, a rotation sensor outputting pulses in a number according to a rotation frequency of the infinite variable-speed drive so as to change the rotation frequency by driving a pilot motor in accordance with the number of the pulses, comprising:

a pulse counter for counting the number of the pulses outputted by the rotation sensor;

a time set unit for setting a first time period;

means for receiving a total pulse number of the pulses counted by the pulse counter during the first time period;

timing means for timing a predetermined time period within the first time period;

means for calculating a calculated pulse number to be counted during the predetermined time period on the basis of the total pulse number;

comparing means for comparing the calculated pulse number with an accumulated pulse number counted by the pulse counter from a start of the first time period during the predetermined time period;

means for calculating a target rotation frequency on the basis of remaining time obtained by subtracting the predetermined time period from the first time period and a remaining pulse number obtained by subtracting the accumulated pulse number from the total pulse number when there is a difference between the accumulated pulse number and the calculated pulse number; and means for driving the pilot motor on the basis of the calculated target rotation frequency.

2. The rotation frequency control apparatus according to claim 1, wherein the timing means times a second time period obtained by equally dividing the first time period, the means for calculating the calculated pulse number multiplies a reference pulse number per second time period by an accumulated number of the second time period(s), the comparing means compares, every time the timing means completes to time one second time period, the accumulated pulse number counted by the pulse counter by the end of timing the second time period with the calculated pulse number, and the means for calculating the target rotation frequency uses remaining time obtained by subtracting accumulated time of the second time period(s) from the first time period and a remaining pulse number obtained by subtracting the accumulated pulse number from the total pulse number when there is a difference between the accumulated pulse number and the calculated pulse number.

3. A method for controlling a rotation frequency of an infinite variable-speed drive, a rotation sensor outputting pulses in a number according to a rotation frequency of the infinite variable-speed drive so as to change the rotation frequency by driving a pilot motor in accordance with the number of the pulses, comprising the steps of:

setting a first time period;

counting a total pulse number during the first time period by using a pulse counter for counting the number of the pulses outputted by the rotation sensor;

timing a predetermined time period from a start of the first time period by using timing means;

calculating a calculated pulse number to be counted during the predetermined time period on the basis of the total pulse number;

comparing the calculated pulse number with an accumulated pulse number counted by the pulse counter from the start of the first time period during the predetermined time period;

calculating a target rotation frequency on the basis of remaining time obtained by subtracting the predetermined time period from the first time period and a remaining pulse number obtained by subtracting the accumulated pulse number from the total pulse number when there is a difference between the accumulated pulse number and the calculated pulse number; and driving the pilot motor on the basis of the calculated target rotation frequency.

4. A method for controlling a rotation frequency of an infinite variable-speed drive, a rotation sensor outputting pulses in a number according to a rotation frequency of the infinite variable-speed drive so as to change the rotation frequency by driving a pilot motor in accordance with the number of the pulses, comprising the steps of:

setting a first time period;

counting a total pulse number during the first time period by using a pulse counter for counting the number of the pulses outputted by the rotation sensor;

timing a second time period obtained by equally dividing the first time period by using timing means;

calculating a reference pulse number per second time period on the basis of the total pulse number;

comparing, every time the timing means completes to time one second time period, an accumulated pulse number counted by the pulse counter by the end of timing the second time period with a calculated pulse number obtained by multiplying the reference pulse number by an accumulated number of the second time period(s);

calculating a target rotation frequency on the basis of remaining time obtained by subtracting accumulated time of the second time period(s) from the first time period and a remaining pulse number obtained by subtracting the accumulated pulse number from the total pulse number when there is a difference between the accumulated pulse number and the calculated pulse number; and driving the pilot motor on the basis of the calculated target rotation frequency.

* * * * *